Inventors:
Peter Boese
Elmar Götz
by: George M Spencer
Attorney

Inventors:
Peter Boese
Elmar Götz
by: George H. Spencer
Attorney

Inventors:
Peter Boese
Elmar Götz
by: George H. Spencer
attorney

United States Patent Office 3,170,062
Patented Feb. 16, 1965

3,170,062
COMPUTER

Peter Boese and Elmar Götz, Berlin-Frohnau, Germany, assignors to Licentia Patent-Verwaltungs-G.m.b.H., Frankfurt am Main, Germany
Filed July 29, 1960, Ser. No. 46,133
Claims priority, application Germany, Aug. 4, 1959, L 33,879
3 Claims. (Cl. 235—155)

The present invention relates to digital computers. More particularly, the present invention relates to a method and apparatus for changing a decimal number into its equivalent binary number.

Computers are now used in ever increasing amounts in the business world and manufacturing field. For example, computers are utilized in calculating machines as well as for controlling the operation of machine tools. Such computers use the binary number system. It therefore becomes necessary to transform the instructions from the conventional decimal numbering system into the binary numbering system in order to provide the proper command signals for the computing mechanism.

The conventional method of carrying out this transformation is through the use of diode matrices. The largest number of diodes D necessary for $n$ outputs is given by the following equation:

$$D=n(2^{n-1})$$

$2^n$ is the largest number of inputs which can be provided if every portion of the matrix is fully utilized. The smallest necessary number of inputs for $n$ outputs is $(2^{n-1}+1)$; that is, the matrix which is not fully utilized provides the following number of diodes D expressed by the following equation:

$$n\cdot 2^{n-1}\geqq D>(n-1)2^{n-2}$$

For example, using a binary system with ten bits of information, it would be necessary to have 5120 diodes in the diode matrix. As the number of bits of information to be presented in the binary number increases, the number of diodes necessary to present such number increases sharply.

Another conventional way to carry out this transformation is to provide computing machines. With such an arrangement, each decimal decade is individually converted into an equivalent binary decade. Each binary decade is then multiplied by the number $10^0$, $10^1(1010)$, $10^2$, and so on, depending upon its particular decade position. This method requires a large number of computing mechanisms and therefore is not usable for simple arrangements.

Accordingly, it is an object of the present invention to provide a new and improved method and apparatus for converting a decimal number into its equivalent binary number without incorporating the disadvantages of the previously known methods.

Another object of the present invention is the provision of a new and improved method and apparatus for converting a decimal number into a binary number utilizing a very small amount of component elements.

With the above objects and advantages in mind, the present invention consists mainly in a method for converting a decimal number having a plurality of decimal decades into a binary number, which method includes as the first step that of converting the decimal number into a binary coded decimal number wherein each decade of the decimal number is separately converted into its respective binary decade. The second step is to divide each of the binary coded decimal numbers in its respective binary decade by 2 so as to produce in each of the binary decades a quotient having a remainder of either the binary numeral 1 or the binary numeral 0. The third step is to add the binary numeral 0 to the quotient in a binary decade when the remainder in the next highest binary decade is the binary numeral 0. The fourth step is to add the binary numeral 5 to the quotient in a binary decode when the remainder in the next highest binary decade is the binary numeral 1. The second, third, and fourth of the above-set-forth steps are then repeated until the binary numeral 0 appears in each position of each of the binary decades.

In a preferred embodiment of the present invention, the decimal number is changed into the binary coded decimal number by means of a plurality of decimal-to-binary decoders. Each of these decoders corresponds to one of the decimal decades of the decimal number to form the respective binary decade. The means for dividing the binary coded number includes a plurality of shift registers which are connected to the output of the respective decoders. The binary numerals 5 and 0 are added by means of a plurality of addition matrices, each of the matrices being connected to the output of a respective shift register.

Additional objects and advantages of the present invention will become apparent upon consideration of the following description when taken in conjunction with the accompanying drawings in which.

Figure 6:
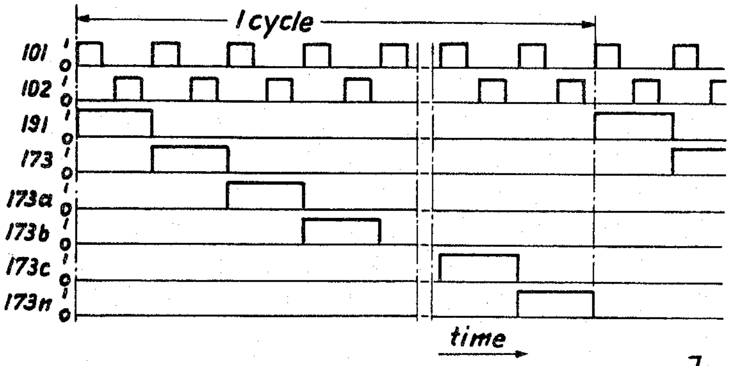

FIGURE 6 contains representations of the wave forms generated by the various elements of the system during a complete operating cycle.

Before providing a complete description of the operation of the various circuit elements of the present invention, the methods utilized by such apparatus will be explained. As has been mentioned hereinabove, the decimal number to be converted is converted into a binary number which has a 0 in the $2^0$ position when the decimal number is even, and a 1 in the $2^0$ position when the decimal number is uneven. In accordance with the present invention, the decimal number to be converted into a binary number is first converted into a binary coded decimal number. This binary coded decimal number is then divided by 2. If the result of such division is an even number in the $2^0$ position, the binary numeral 0 would appear, whereas if the result is an uneven number, the binary numeral 1 would appear. The numbers appearing after the decimal point are, for this purpose, not considered. This result is again divided by 2. If the new result is an even number, then in the $2^0$ position the binary numeral 0 would appear, whereas for an uneven number the binary numeral 1 would appear. This division by 2 and the testing of the result for an even or uneven number is then continued and repeated until all of the numbers remaining are the binary numeral 0. For example, if the decimal numeral is 109, binary number 1101101 is obtained as follows by utilizing the above described method:

109 uneven→1—$2^0$ position of binary number
54 even→0—$2^1$ position of binary number
27 uneven→1—$2^2$ position of binary number
13 uneven→1—$2^3$ position of binary number
6 even→0—$2^4$ position of binary number
3 uneven→1—$2^5$ position of binary number
1 uneven→1—$2^6$ position of binary number Thus, the decimal number 109 corresponds to the binary number 1101101.

It can be seen that for the conversion from the decimal number to the binary number there must be two operations, the first being the division by 2 and the second being the determination as to whether the result is an even or an uneven number.

Figure 1:
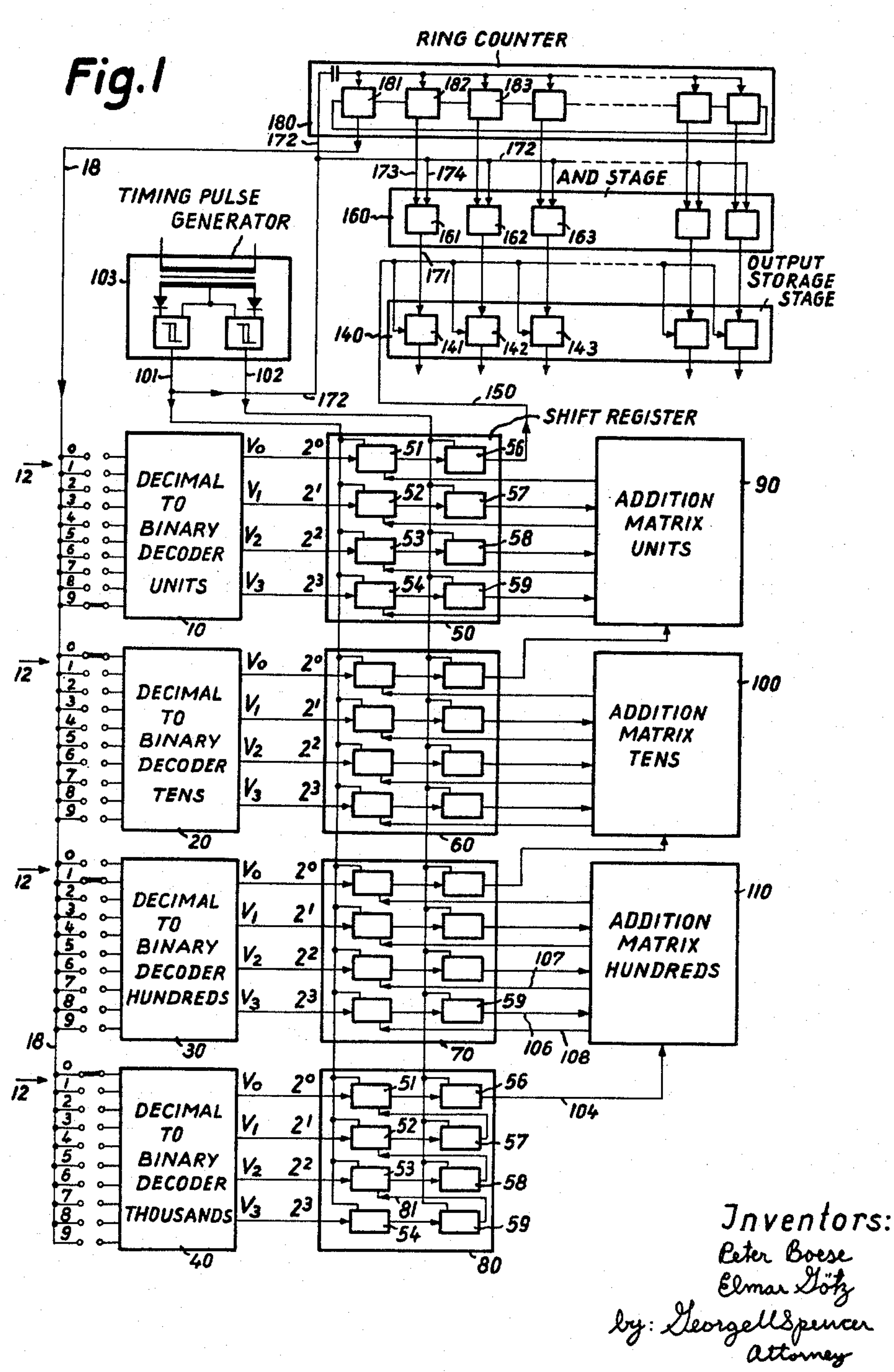
FIGURE 1 is an electrical schematic diagram showing the interconnections between each of the individual elements of the apparatus incorporating the principles of the present invention.

Referring now to the drawings and more particularly to FIGURE 1, the decimal number to be converted is applied to decimal binary decoders. In FIGURE 1, four such decoders 10, 20, 30, 40 are indicated. Decoder 10 is the units decoder; decoder 20, the tens decoder; decoder 30, the hundreds decoder; and decoder 40, the thousands decoder. For the numeral 109 the decoder 10 would have the numeral 9 recorded therein; the decoder 20 would have the numeral 0; the decoder 30, the numeral 1; and the decoder 40, the numeral 0. In this manner, each position or decade of the decimal number is placed in its own respective binary decade utilizing the 8–4–2–1 code. This would be set up as follows:

$$109=\frac{\text{Hundreds Decoder 30}}{0001}\;\frac{\text{Tens Decoder 20}}{0000}\;\frac{\text{Units Decoder 10}}{100\,[1]}$$

This transformation can be carried out by means of a diode matrix having ten inputs 0–9 and four outputs $V_3$, $V_2$, $V_1$ and $V_0$.

Figures 2, 3:
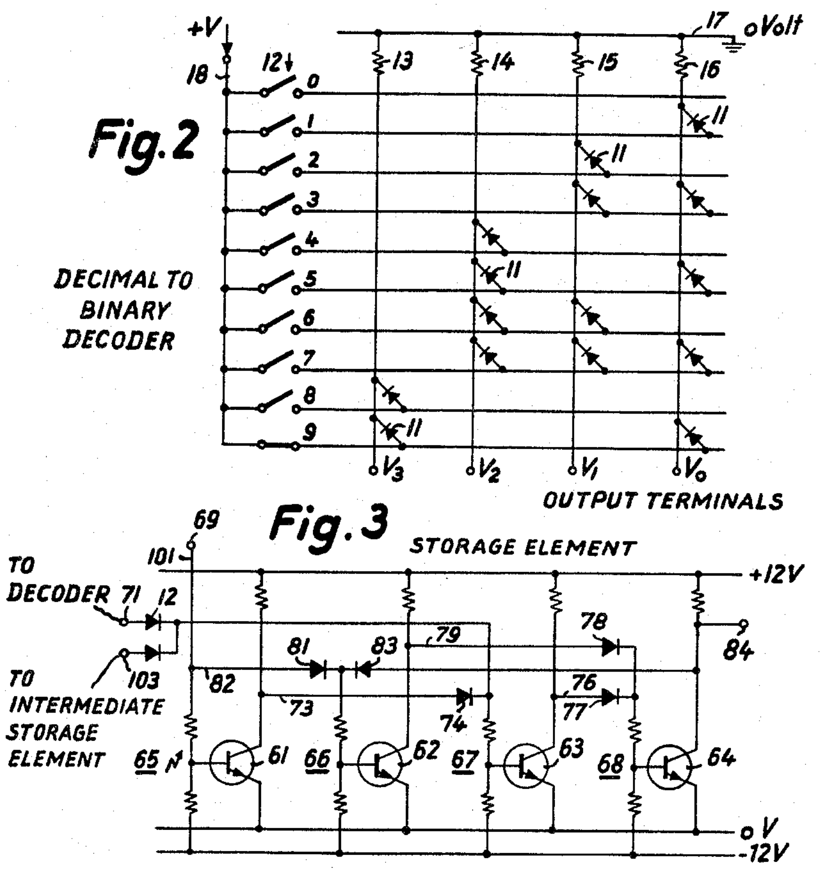
FIGURE 2 is a schematic diagram of a decimal-to-binary decoder as used in FIGURE 1.
FIGURE 3 is an electrical schematic diagram of a storing element which is part of the shift register of FIGURE 1.

Such an arrangement is shown in FIGURE 2. Referring to this figure which represents the decoders 10 of FIGURE 1, it will be seen that fifteen diodes 11 are used. There are ten switches 12 of the decimal-to-binary decoder shown in Figure 1, each of the switches being labelled with the respective numerals 0–9 representing digits of a decimal number. Since this in the decoder 10 which is being illustrated, it can be seen that the switch corresponding to the decimal digit 9 is closed.

Resistors 13, 14, 15 and 16 are connected in the vertical conductors of the decoder. One end of each of the resistors is connected to a common ground coductor 17, while the other end of the resistors 13–16 are respectively connected to different output terminals of the decoder. Thus, resistor 13 is connected between the ground conductor 17 and the output terminal $V_3$; resistor 14 is connected between 17 and $V_2$; resistor 15 is connected between 17 and $V_1$, and resistor 16 is connected between 17 and $V_0$.

In operation, the common side of the switches 12 are connected to a positive voltage, for a pre-selected time interval, by means of the conductor 18. With this arrangement the positive voltage will be applied through the closed switch 12 to the output circuit or circuits connected to the closed switch. With this arrangement, the following output voltage combinations are possible:

| Position of Switch 12 Closed | Voltage at Output Terminals | | | |
|---|---|---|---|---|
| | $V_3$ | $V_2$ | $V_1$ | $V_0$ |
| 0 | 0 | 0 | 0 | 0 |
| 1 | 0 | 0 | 0 | + |
| 2 | 0 | 0 | + | 0 |
| 3 | 0 | 0 | + | + |
| 4 | 0 | + | 0 | 0 |
| 5 | 0 | + | 0 | + |
| 6 | 0 | + | + | 0 |
| 7 | 0 | + | + | + |
| 8 | + | 0 | 0 | 0 |
| 9 | + | 0 | 0 | + |

It is apparent that the output terminals that will have a positive voltage appear thereon are those which are connected to the input by means of a diode. In the illustrated case, in FIGURE 2, wherein the switch 12 corresponding to the numeral 9 is closed, it is clear that the output terminals $V_3$ and $V_0$ will have positive voltages applied thereon corresponding to the binary numeral 1. The output terminals $V_2$ and $V_1$, however, will be connected through the respective resistors 14 and 15 to ground potential and therefore have 0 voltage applied thereon corresponding to the binary numeral 0.

Thus, the illustrated binary-to-decimal decoder 10 converts the decimal numeral 9 into the binary code 100[1]. From the above table it is clear that any desired decimal digit can be converted into its equivalent binary coded numeral by means of the decoder of FIGURE 2.

Referring back again to FIGURE 1, it will be seen that for each decimal decade a separate switch 12 and binary decoder is used so that each decimal decade is converted effectively into a binary decade when the total decimal number is converted into its equivalent binary coded decimal number. In each decoder 10, 20, 30 and 40, the even decimal digit has in the $2^0$ position the binary numeral 0, while the odd decimal digit has the binary numeral 1 in the $2^0$ position. Thus, in the illustrated example, the decoder 10 transformed the decimal digit 9 into the binary number 1001 and since the decimal number 9 is an odd number, the binary numeral 1 appears in the $2_0$ position.

In order to divide a binary coded decimal number by two in the 8–4–2–1 code, the columnar position of the number is displaced once to the right with the remainder not being utilized. For example, to divide 9 by 2

1001 = 9
↘↘↘
100 = 4

In accordance with the present invention, these divisions by two are carried out by the shift registers 50, 60, 70 and 80 of FIGURE 1. It will be seen that the register 50 is connected to the output of the unit decoder 10; that the register 60 is connected to the tens decoder 20; that the register 70 is connected to the hundreds decoder 30; and that the register 80 is connected to the thousands decoder 40.

When the decimal number to be converted to the binary number has a plurality of decades, the remainder due to the division in the next highest decade must be reviewed to determine whether it is an even (0) or an uneven (1) number. In accordance with the present invention, for an even remainder the binary numeral 0 is added and for an odd remainder the binary numeral 5 (0101) is added. Accordingly, addition matrices 90, 100 and 110 are provided to carry out these additions of the binary numeral 0 or the binary numeral 5.

With the above described apparatus, the decimal number 109 will be converted into its corresponding binary numeral by such apparatus as follows:

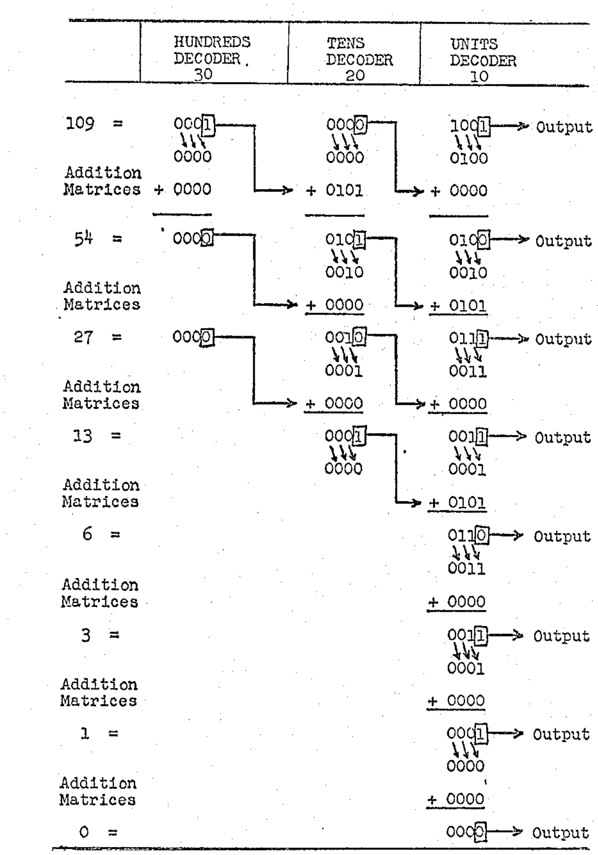

The result is thus 01101101.

The shift registers 50, 60, 70 and 80 are provided to carry out the division of the binary coded decimal number by two. These shift registers each include storage elements and intermediate storage elements. In the shift registers 50 and 80 the storage elements are represented by the small boxes 51, 52, 53 and 54 while the intermediate storage elements are represented by the boxes 56, 57, 58 and 59.

The operation of the storage and intermediate storage elements of the shift registers will be explained in conjunction with FIGURE 3.

The storage element of FIGURE 3 is made up of four single stage inverting amplifiers including the transistors 61, 62, 63 and 64. The base electrode of each of the transistors is connected to the junction point of an input voltage divider 65, 66, 67 and 68 respectively. The voltage dividers are set up so that when the input signal applied thereto equals zero, the voltage on the base electrodes of each of the n-p-n transistors will be negative. Such transistor will then be in blocked condition and no current will flow therethrough. On the other hand, when the input signal corresponding to the binary numeral 1, which equals 12 volts, is applied to the input voltage divider, the base electrode of the transistor goes slightly positive so that the transistor conducts. The output voltage from the transistor in its blocked condition is 12 volts corresponding to the binary numeral 1 while in the conducting condition the output voltage is zero corresponding to the binary numeral 0.

The timing pulse for operation of the storage element is applied to the input terminal 69 and from there to the input voltage divider 65 of the transistor 61. If this input pulse equals zero voltage, the transistor 61 will then be blocked, as explained above, and its output will be equal to the binary numeral 1, or 12 volts.

The storage element of FIGURE 3 has a second input terminal *n* which is connected to the voltage divider input 67 of the transistor 63 by means of the diode 72. The transistor 63 is in conducting condition regardless of whether the voltage applied to the input terminal 71 is zero or positive, as long as the transitsor 61 is blocked. This is so because the output from transistor 61 is applied to conductor 73 through diode 74 to the voltage divider 67. Since this output voltage is +12 the transistor 3 will always be conducting regardless of what additional voltage is also applied to the voltage divider 67.

Accordingly, the output from transistor 63, which is applied to conductor 76, will be zero whenever the transistor 61 is in non-conducting or blocked condition.

The output conductor 76 is connected to one side of the diode 77 the other side of which is connected to the voltage divider 68 of the transistor 64. With the output of the transistor 63 being zero, the diode 77 is in reverse bias condition and, accordingly, is blocked. Under these circumstances the conducting condition of transistor 64 depends only on the condition of the diode 78 which is connected between the voltage divider 68 and the output conductor 79 of the transistor 62. It will be seen that the output voltage from transistor 62 is applied to conductor 79 through diode 78 to the base electrode of the transistor 64.

A further diode 81 is arranged between the voltage divider 66 and the input terminal 69 by means of the conductor 82. Finally, a diode 83 is connected between the voltage divider 66 and the output of the transistor 64.

When the input voltage applied to the terminal 69 is zero, the diode 81 is in reverse bias condition and is ineffective for controlling transistor 62. In this manner, the transistors 62 and 64 are coupled to each other by means of diodes 78 and 83 and thereby form a bistable multivibrator. This multivibrator can not be controlled by means of the diodes 81 or 77. The conducting condition of this multivibrator is then independent of the remaining conditions of the storage elements; therefore, when the voltage applied to the input terminal 69 is zero, the output terminal 84 connected to the output of the transistor 64 can be either zero or positive corresponding respectively to the binary numeral 0 or 1, depending upon whether the transistor 64 is in conducting or blocked condition.

If the voltage applied to the input terminal 69 is positive, corresponding to the binary numeral 1, then the transistor 61 and transistor 62 will both be conducting. The output voltage from the transistor 61 will be zero so that the diode 74 will be in reverse bias condition and the conducting condition of the transistor 63 will be determined solely by the voltage applied to the input terminal 71.

Similarly, the output voltage of the transistor 62 will be zero so that the diode 78 will be in reverse bias condition. Thus, the conducting condition of the transistor 64 will be determined solely by the voltage applied to the diode 77. In the given case wherein the input voltage applied to 69 is positive, the transistor 63 will be controlled by the voltage applied to the input terminal 71. The output of the transistor 63 which is applied through the diode 77 to the base electrode of the transistor 64 will then directly control the conducting condition of the transistor 64.

Inasmuch as there are two phase inversions, each inversion taking place in transistors 63 and 64 respectively, the polarity of the voltage appearing at the output terminal 84 of the transistor 64 will be the same as the polarity of the input signal applied to the input terminal 71. Consequently, if the voltage applied to the input terminal 69 is positive, corresponding to the binary numeral 1, then the voltage appearing on the output terminal 84 will be of the same polarity as the voltage being applied to the input terminal 71. If the voltage applied to the input terminal 69 equals 0, corresponding to the binary numeral 0, then the storage element will maintain on its output terminal 84 whatever signal has previously been stored thereon.

A storage element of the type shown in FIGURE 3 is connected to each output terminal of the decimal-to-binary decoder of FIGURE 2, i.e., the input terminal 71 of the storage element, FIGURE 3, will be connected to the output terminal $V_3$ of the decoder shown in FIGURE 2. Similarly, each of the remaining output terminals $V_2$, $V_1$ and $V_0$ of FIGURE 2 is connected to a storage element similar to that shown in FIGURE 3.

This arrangement is shown in FIGURE 1. It will be seen that at the output of the decoder 10 there are four storage elements 51, 52, 53 and 54 connected, respectively, to each output terminal $V_0$, $V_1$, $V_2$ and $V_3$. The storage elements 51–54 are arranged in the shift register 50.

Also arranged in the shift register 50 are the intermediate storage elements 56, 57, 58 and 59. These intermediate storage elements are constructed in precisely the same manner as that shown in FIGURE 3. It will be seen, however, that the input to the storage elements 51, 52, 53 and 54 is connected to the common conductor 101 whereas the common input to the intermediate storage elements 56, 57, 58 and 59 is connected to the input conductor 102. The input conductor 101 is connected to the timing pulse generator 103 which generates a pulse which is applied to conductor 101 and a second pulse in different time sequence which is applied to conductor 102.

In operation, whenever a pulse is applied to the conductor 101, which pulse is a positive voltage, whatever information is contained in the decoder 10 will be applied to the respective storage elements 51, 52, 53 and 54 and remain stored therein after the end of the pulse on conductor 101. The intermediate storage elements will then have transferred thereto the information stored in the storing elements 51–54 when a positive voltage is applied to the conductor 102. This information, which has been obtained from the decoder 10, will remain in the intermediate storage elements 56–59 after the end of the pulse appearing on conductor 102.

Referring now, in FIGURE 1, to the shift register 80 which is the highest binary decade illustrated, it will be seen that this shift register also includes four storage elements 51, 52, 53 and 54 and four intermediate storage elements 56, 57, 58 and 59. The output of the intermediate storage element 59 is connected by way of conductor 81 to the input of the storage element 53. This input corresponds to the input 103 of FIGURE 3. From FIGURE 3 it can be seen that the input terminal 71 is connected to the output of the decoder while the input terminal 103 is connected to the intermediate storage element in the same shift register.

Accordingly, for the shift register 80, when the first timing impulse appears on the conductor 101 at the same time as a timing pulse appears on conductor 18, whatever information is stored in the decoder 40 will be shifted and stored in the storage elements 51–54. The next pulse, appearing on conductor 102, will shift the stored information from the storage elements 51–54 to the intermediate storage elements 56–59. With the next timing impulse appearing on the conductor 101, the information from the intermediate storage elements will be transferred back into the storage elements 51–54.

It will be noted that for the highest decade, the information coming from the decoder 40 will all be 0's since this number has been shifted once to the right, which is the result of the division by two. Therefore, the only information that will be stored in the storage elements 51–54 of the shift register 80 will be that information applied to the terminals 103, namely, the information coming from the intermediate storage elements 56–59.

It will be seen from the above that the highest decade of the decimal number has been shifted into its proper binary decade position so that this number has been divided by two. The remainder that may be left, which can be either the binary numeral 0 or the binary numeral 1, is applied on the output conductor 104 of the shift register 80 to the additional matrix 110.

In the remaining decades, the remainder that has been obtained due to the division by two in the next highest decade must be taken care of in the shift register. That is, when the binary number is divided by two and the remainder is 0, the value 0 can be added to the next lowest decade. If, however, the remainder in a binary decade is the binary numeral 1, the binary number 5 must be added to the next lowest decade.

This is achieved in, for example, the hundreds decade in the following manner: It will be seen that in the corresponding shift register 70, the output from the intermediate storage element 59 is applied on the conductor 106 to the addition matrix 110. This output has added to it either the binary numeral 0 or the binary numeral 5 in the addition matrix 110 and the new value is applied on conductor 107 to the input of the storage element 53 of the shift register 70. The result of the number applied on conductor 104 to the matrix 110 is also taken care of at this time by the application of the output of the matrix 110 on conductor 108 to the storage element 54 of the shift register 70.

The timing is the same as before. Upon the appearance of the first timing pulse on conductors 101 and 18, the information in the decoder 30 is applied to the respective storage elements 51–54 in the shift register 70. The information remains stored therein after the end of the pulse on the conductor 101. The next pulse appears on conductor 102 and shifts the information from the shift registers 51–54 to the intermediate storage elements 56–59 of the shift register 70. At this time, the output of the intermediate storage elements 56–59 is applied to the addition matrix 110. The next pulse that appears on conductor 101 then shifts the information from the addition matrix 110 into the storage elements 51–54 of the shift register 70. These operations are repeated on each of the shift registers and their respective addition matrices. The method whereby the binary numeral 0 or the binary numeral 5 is added in the addition matrix will be explained with respect to FIGURE 4.

Figure 4:
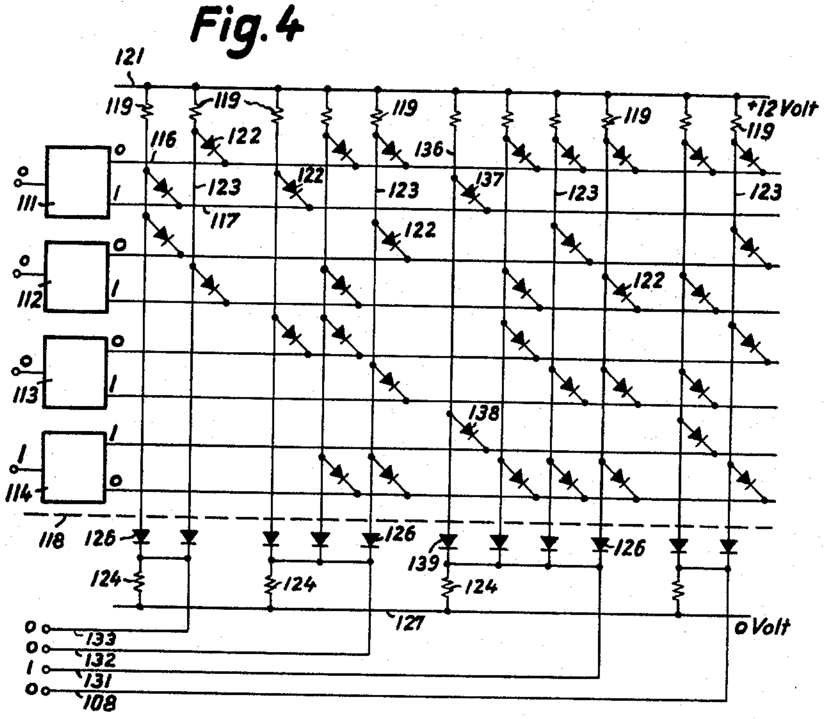
FIGURE 4 is a schematic diagram of an addition matrix used in the arrangement of FIGURE 1.

Referring now to FIGURE 4, the addition matrix for adding the binary numeral 0 or the binary numeral 5 is illustrated. In the addition matrix, several input signals are combined to form the output signal, as distinct from the arrangement in FIGURE 2 wherein one input signal is used to form several output signals. For the addition matrix, the input signals are provided in double ended form. That is, both the positive and the negative signals are provided. This is obtained from the four switching circuits 111, 112, 113 and 114. To provide the proper polarity signals, these circuits 111–114 may, for example, be two-stage amplifier circuits. The two outputs can be taken one from each respective stage so that if the output of the first stage is negative, the output from the second stage of the amplifier will be positive. These outputs are applied to the horizontal conductors of the matrix in FIGURE 4 and it will be seen that the output of circuit 111 is applied to conductors 116 and 117.

The addition matrix is made up of a plurality of AND circuits and OR circuits. The AND circuits of FIGURE 4 are arranged above the dashed line 118. The OR circuits are arranged in the figure below the dashed line 118.

The inputs to the AND circuits are the outputs from the switching circuits 111–114. Similarly, the inputs to the switching circuits are the outputs of the intermediate storage elements 56–59 of FIGURE 1.

The AND circuits include a plurality of resistors 119 arranged in the vertical conductors of the matrix, all the resistors 119 having one of their ends, respectively, connected to a conductor 121 which has applied thereto the plus voltage corresponding to the binary numeral 1.

The other ends of the resistors 119 are connected to the anodes of the AND diodes 122 by means of the vertical conductors 123 of the addition matrix.

Below the dashed line 118 are the plurality of resistors 124 and diodes 126 making up the OR circuits. One end of each of the resistors 124 is connected to the ground or zero voltage conductor 127 whereas the other end of each of the resistors 124 is connected to the cathodes of the OR diodes. The four output conductors of the addition matrix 108, 131, 132 and 133 are connected to the junction points of the OR circuits between the resistors 124 and the diodes 126.

The switching circuits 111, 112, 113 and 114 can be made up of either transistors or tubes. This is not material as long as both the positive and negative pulses are provided.

In operation, in the addition matrix the output of the switching circuits 111–114, which can be either the plus voltage corresponding to the binary numeral 1 or zero voltage corresponding to the binary numeral 0, are applied to the cathodes of the AND diodes 122. In each AND circuit there are at least two diodes and one resistor. For example, the first vertical conductor of the addition matrix has the anodes of the two AND diodes connected thereto and one resistor connected in series therewith. If the outputs from the circuit 111 and 112 are both positive so that the horizontal conductors connected to these diodes 122 are positive, then the potential of the vertical conductor connected to the anodes of the diodes will be positive. It will be seen that the two diodes connected in the first vertical conductor are effectively connected in parallel with respect to the resistor in the back bias direction.

If one of these diodes has a positive voltage applied thereto while the other has a negative voltage applied thereto, then the vertical conductor will have a zero voltage thereon since the diode which is controlled by the negative voltage is open. If both of the diodes have negative voltage applied thereto from the respective switching circuits 111 and 112, then the voltage appearing on the first vertical conductor will be 0. The four different available conditions are shown by the following table:

| Cathode of First Diode | Cathode of Second Diode | Vertical Conductor |
|---|---|---|
| 0 | 0 | 0 |
| 0 | + | 0 |
| + | 0 | 0 |
| + | + | + |

In the above table, the positive voltage corresponds to the binary numeral 1 and the zero voltage corresponds to the binary numeral 0.

Since some of the AND circuits include more than two diodes, it is apparent that all of the diodes must be connected to a positive potential at their respective cathodes in order for the vertical conductor connected to the anodes to have a positive voltage thereon.

The OR gates arranged below the dashed line 118 are controlled by the conductive condition of the AND gates. The operation will be explained with respect to the two diodes 126 connected respectively to the first and second vertical conductors 123 at the left-hand portion of the addition matrix.

The potential which appears on the output conductor 133 is dependent upon the potential applied to the anodes of the two diodes 126 to which such conductor is connected. The following table gives the respective output voltage appearing on conductor 133 depending upon the respective positive or zero potential connected to the anodes of the diodes 126:

| Anode of First Diode | Anode of Second Diode | Output Conductor 133 |
|---|---|---|
| 0 | 0 | 0 |
| 0 | + | + |
| + | 0 | + |
| + | + | + |

As before, the positive potential corresponds to the binary numeral 1 and the zero potential corresponds to the binary numeral 0. If the OR gates include more than two diodes, the output conductor connected to the OR gate will have a positive potential applied thereto if a positive potential is applied to any one or to all of the diodes of the OR gate.

The operation of the addition matrix will now be explained with respect to a specific example, namely, the decimal digit 9 corresponding to the binary numeral 1001. This number has been divided by two. It should be noted for this illustrative example that the digit 9 appears in the binary decoder 10. The next highest decade, namely, the decoder 20, has the numeral 0 arranged therein so that the number to be transferred into the decoder 10 is 0.

The division of the digit 9 (1001) in the shift register 50 of FIGURE 1 produces the binary number 100 by shifting each digit once to the right. Under these conditions the voltages applied to the four switching circuits 111–114 are as follows: the voltage applied to the switching circuit 111, which comes from the shift register 60, is zero; hence no addition is to be made. The voltage applied to the circuit 112 is 0; to 113 is 0; and to 114 is 1. The voltages available on the output of the respective circuits 111–114 under these conditions are shown in FIGURE 4.

Under these conditions all of the vertical conductors in the addition matrix, with the exception of the vertical conductor marked 136, will have zero potential applied thereto. The vertical conductor 136, however, will have positive potential applied thereto since the two diodes 137 and 138, whose anodes are connected to conductor 136, have applied to their cathodes the potential 1 from the circuit 111 and the potential 1 from the circuit 114. Thus, on the anode of the diode marked 139 in the OR circuit connected to the vertical conductor 136, there will be applied a positive voltage. On the anodes of the three other diodes 126 forming the OR gate with the diode 139 there will, of course, appear a zero voltage. In accordance with the last table above set forth, this arrangement will provide on the output conductor 131 a positive voltage which will correspond to the binary numeral 1. The outputs on the conductors 133, 132 and 108 will all be zero. Therefore, the four outputs taken in combination give the binary numeral 0100 corresponding to the numeral 4 or the numeral 9 divided by two. The remainder is not considered.

If in the preceding example the number transferred from the next highest decade had been 1, it would have been necessary to add the binary numeral 5 to the output of the addition matrix. Since the numeral 1 is transferred to the addition matrix into the swiching circuit 111, the binary numeral shown at the input and outputs of circuit 111 would be reversed. The remaining three circuits, 112, 113 and 114 would, of course, have the same potentials applied thereto. The output on conductor 133 would have been a plus potential since the potential applied to the second diode would have been plus while the potential applied to the first diode of the OR gate connected to the conductor 133 would have been zero. This gives the result of a plus potential output.

The output on the output conductor 108 would also be 1 or plus since the voltage applied to the last vertical conductor would be zero while the voltage applied on the next to the last vertical conductor would be plus. Accordingly, the OR gate connected to the output conductor 108 would then have the plus potential connected thereto. The remaining OR gates would have negative potential and the outputs on 131 and 132 would be zero. This would accordingly give the binary output numeral 1001 which equals 9. Thus, it will be seen that the result of 9 would correspond to the number 19 divided by two with the remainder not being considered. Before, with no number being transferred from the next highest decade, the number divided by two was 9, giving the result 4 with the remainder being dropped.

Referring back once more to FIGURE 1, the overall operation of the apparatus will again be considered. Starting first with the binary decoder 40, this corresponds to the thousands decade. In the illustrated example, the decimal digit is 0 since the example contains no thousands digit. This number in the decoder 40 is converted into the binary decimal number 0 and the four binary signals which are produced are applied to the storage elements 51, 52, 53 and 54. This occurs upon the appearance of pulses on conductors 18 and 101. The element 51 corresponds to the $2^0$ position; element 52 corresponds to the $2^1$ position; element 53 corresponds to the $2^2$ position; and element 54 corresponds to the $2^3$ position. As previously explained, the elements 51–54 will store the voltages applied to their inputs only during the timing signal applied on the conductor 101 from the timing pulse generator 103.

The potentials stored in the storage elements 51–54 are then shifted to the intermediate storage elements 56–59, respectively, during the application of a positive pulse to the conductor 102 from the timing pulse generator 103. Since the thousands decade is the highest decade, there are no remainders transferred thereto and the number in this decade is merely divided by two.

At the end of this operation the storage element 54 has 0 therein since the binary numeral has been transferred therefrom to the intermediate storage element 59. Similarly, appearing on output conductor 104 connected to the intermediate storage element 56 will be the remainder, either 0 or 1, to be transferred to the next lowest decade by means of the addition matrix 110. The pulses will then be applied to the conductors 101 and 102 alternately until only the numeral 0 remains in the storage elements of the shift register 80. The binary numerals will continually be shifted through the shift registers 50, 60, 70 and 80 with the proper additions being carried out by the addition matrices 90, 100 and 110 so that the numbers will be shifted through the shift registers until they contain only 0. At this time, the complete division will be carried out and the binary number will have been obtained from the decimal number.

This arrangement has been explained with respect to four position decimal numbers going only as high as the thousands decade. However, it is clear that if additional decimal decades are added it is necessary merely to add additional decoders, shift registers and addition matrices in the same way.

The binary number that is achieved from the operations of the decoder, shift registers, and addition matrices is stored as shown in FIGURE 1 in the storage element 140 containing additional storage circuits 141, 142, 143, etc., and as many additional stages as necessary to provide all of the digits of the output binary number. The inputs to the storage element 140 are obtained from the output conductor 150 which is connected to the intermediate storage element 56 of the shift register 50.

The conductor 150 is connected in parallel with all of the storage elements in the storage member 140. Which of the storage elements has the digit stored therein is determined by the AND circuit member 160 of FIGURE 1. The AND circuit member 160 includes a plurality of AND circuits 161, 162, 163, etc. depending upon how many digits are in the final binary number. It will be seen that each AND circuit is connected to one of the storage elements of member 140 so that the AND circuit 161, for example, is connected by means of conductor 171 to the storage element 141.

The AND circuit 161 has connected thereto conductors 173 and 174. The conductor 174 is connected to the common conductor 172 which, in turn, is connected to the conductor 101 so that it has applied thereto the impulses that appear on the conductor 101. The conductor 173 is connected to the second stage 182 of a ring counter 180. The first stage 181 of the ring counter 180 produces the first pulse on conductor 18 which is applied to the switching elements 12 in which the decimal number is originally set up.

The ring counter 180 has $n+2$ stages. If the stage 181 is active, then the output pulse applied therefrom is applied to the switches 12 and this number is then shifted into the respective decoders 10, 20, 30 and 40. The pulse applied to the conductor 101 is also produced at this time, as will be indicated later with respect to FIGURE 6, so that the numbers are shifted respectively into their shift registers. The next time the positive potential is applied to conductor 101, the ring counter moves so that its next stage is effective and the combination of the pulse on conductor 101 and the operation of stage 182 sets up the AND element 161 of the AND circuit 160. This, in turn, sets up the storage element 141 of the storage member 140 so that any output that is obtained on the output conducor 150 will be stored in the storage element 141.

The next positive pulse applied to conductor 101 is also applied to the ring counter to set up the next stage of the ring counter. This next stage, in turn, sets up the AND stage in member 160 and the storage element in member 140. After all of the stages of the ring counter have been activated, all of the binary numbers will have been shifted through the various shift registers and the binary number corresponding to the originally applied decimal number will, therefore, appear in the storage element 140.

When the last stage of the ring counter 180 is activated, the numbers in the shift registers will all be the binary numeral 0 and the apparatus will then be available for the next conversion of a decimal number to a binary number. The decimal number to be converted can then be set up in the switches 12 and the timing cycle can then start once again.

The timing pulse generator 103 produces a sine wave which is rectified by means of a half-wave rectification to provide two half-waves which are displaced from each other by 180 degrees. These half-waves control a flip-flop circuit giving a preselected amplitude for each cycle of the flip-flip. The output from the flip-flop circuit is in the form of rectangular pulses which are applied to the conductors 101 and 102 in the required time relationship.

Figure 5:
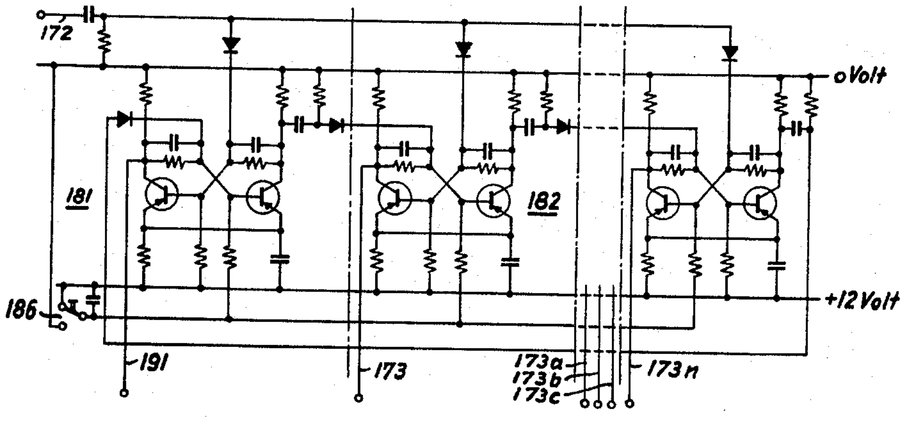
FIGURE 5 is a schematic diagram of a ring counter as used in FIGURE 1.

The ring counter circuit will be described in conjunction with FIGURE 5. It will be seen that each stage 181, 182, etc. is a bi-stable flip-flop circuit which is arranged in series with the remaining circuits to provide a conventional ring circuit. By operation of the switch 186, the following conducting conditions are achieved: In the stage 181, the left-hand transistor will be conducting while the right-hand transistor will be cut off. In all the remaining stages of the ring counter, the left-hand transistor will be cut off while the right-hand transistor will be conducting. Therefore, the output on conductor 191 will be plus corresponding to the binary numeral 1 while the output on the conductor 173 and all of the remaining output conductors of the ring circuit 180 will be zero corresponding to the binary numeral 0. The rectangular pulse which is applied on the conductor 172 will then shift the conducting conditions of the first stage 181 so that the left-hand conductor will become cut off and the right-hand conductor will have current flowing therethrough. This will trip the next successive stage, changing the output condition on conductor 173 from zero to plus and the output on conductor 191 from plus to zero.

Thus, as each rectangular pulse is applied to the conductor 101, it is transferred by means of conductor 172 to the ring counter 180 and serves to trip each of the ring counter stages so as to set up the next successive stage in the ring counter, the ouputs of the stages being shown schematically at 173*a*, 173*b*, 173*c* and 173*n*. This, in turn, sets up the AND circuit of the AND circuit arrangement 160 and the respective storage elements in the storage member 140.

Referring now to FIGURE 6, the wave shapes provided by the various circuit elements in FIGURE 1 will be shown in their proper time relationship. The switch 186 of FIGURE 5 of the ring counter is operated. This sets up the ring counter so that the first rectangular pulse appearing on the conductor 101 will produce the positive potential on output conductor 18 from the first stage 181 of the ring counter 180. The voltage applied on conductor 18 to the switches 12, which is achieved simultaneously with the pulse appearing on conductor 101, will shift the decimal number set up in the switches 12 through their respective binary decoders to the storage elements in their respective shift registers.

The next pulse appears on conductor 102 and shifts this information from the storage elements in the shift registers to the intermediate storage elements. After the end of he pulse on conductor 102, the next pulse on conductor 101 appears. This shifts the conducting conditions of the stages of the ring counter so that the output on conductor 18 goes to zero while the output on conductor 173 becomes plus. At the same time, the information from the intermediate storage elements is shifted back into the storage elements. Simultaneously, the output from ring counter 180 on conductor 173 sets up the AND stage 161 which, in turn, sets up the storage element 141 in the storage member 140.

The next pulse appearing on conductor 102 shifts the information from the storage element to the intermediate storage element and there appears on the output conductor 150 the first binary numeral either 0 or 1, which is stored in the first stage 141 of the storage member 140. This cycle continues with the next pulse appearing on conductor 101 switching in the next stage on the ring counter, setting up the AND circuit and storage elements 160 and 140, respectively, while simultaneously shifting the information from the storage element of the shift registers to the intermediate storage elements.

The next impulse appearing on the conductor 102 then shifts the information back to the storage elements and provides the next output binary digit for the storage member 140. At this time, the information is also shifted through the respective addition matrices as has been explained hereinabove. This cycle pattern continues until all of the stages of the storage member 140 have binary numerals registered therein or at least as far as required by the number of decades in the decimal number to be converted to a binary number. For example, if there are five decades in the decimal number to be converted, it would be necessary to have four switches for each decade and fifteen storage members 140. There must be sufficient storage elements in storage member 140 to continue storing binary numerals until all of the storage elements 51–54 and intermediate storage elements 56–59 of the shift registers 50–80 have only the binary numeral 0 stored therein. At this point, the conversion from the decimal number to the binary number has been completed and the apparatus can then be set up for a new decimal-to-binary conversion.

It will be understood that the above description of the present invention is susceptible to various modifications, changes and adaptations, and the same are intended to be comprehended wtihin the meaning and range of equivalents of the appended claims.

We claim:

1. Decimal-to-binary converter comprising, in combination:

(*a*) decimal-to-binary encoding means for encoding a binary number;

(*b*) an *n*-decade shifting register connected to said encoding means for dividing the binary encoded decimal number, each of said shifting register decades including a series of storage elements and a series of intermediate storage elements, each of said storage and intermediate storage elements constituting a stage corresponding respectively to a binary digital position of a binary number, said storage elements being connected to a first common input and said intermediate storage elements being connected to a second common input, whereby a pulse appearing on said first common input shifts binary digit information stored in said storage elements to said intermediate storage elements and a pulse appearing on said second common input shifts said information back to said storage elements, said binary digits being shifted downwardly by one digit position upon being shifted from said intermediate storage elements to said storage elements; and (*c*) addition matrix means having ($n$—1) decades, each of said addition matrix decades being connected to a respective one of said shifting register decades except the highest-order shifting register decade for controlling the respective shifting register decade and to be controlled thereby, each of said matrix decades having a control input connected to the lowest-order stage of the shifting register decade of the next-highest order, said connections between said matrix decades and said shifting register decades being the sole connection to and from said matrix decades.

2. The combination defined in claim 1 wherein each of said storage elements and said intermediate storage elements comprises bistable switching circuits, the stable state of each stage of said bistable switching circuit depending upon the binary digit informaiton stored therein, each of said switching circuits having at least a first and second input, whereby a pulse applied to either said first or said second input will not shift said binary digit information but a pulse applied simultaneously to both said inputs will shift said binary digit information.

3. The combination defined in claim 2 wherein each of said storage elements and said intermediate storage elements comprises four one-stage switching amplifiers, two of said amplifiers forming a bistable switching circuit isolated from said first and second inputs by diodes, the third of said amplifiers being connected between one of said two amplifiers and one of said inputs, and the fourth of said amplifiers being connected between the other of said two amplifiers and said second input, whereby pulses appearing simultaneously on both of said inputs will reverse the stable state of each of the two amplifiers forming said bistable switching circuit and thereby shift said binary digit information stored therein.

References Cited by the Examiner

UNITED STATES PATENTS

| | | | |
|---|---|---|---|
| 2,940,699 | 6/60 | Hobbs | 235—155 |
| 3,026,035 | 3/62 | Couleur | 235—155 |

MALCOLM A. MORRISON, *Primary Examiner.*

WALTER W. BURNS, *Examiner.*